United States Patent Office 3,494,387
Patented Feb. 10, 1970

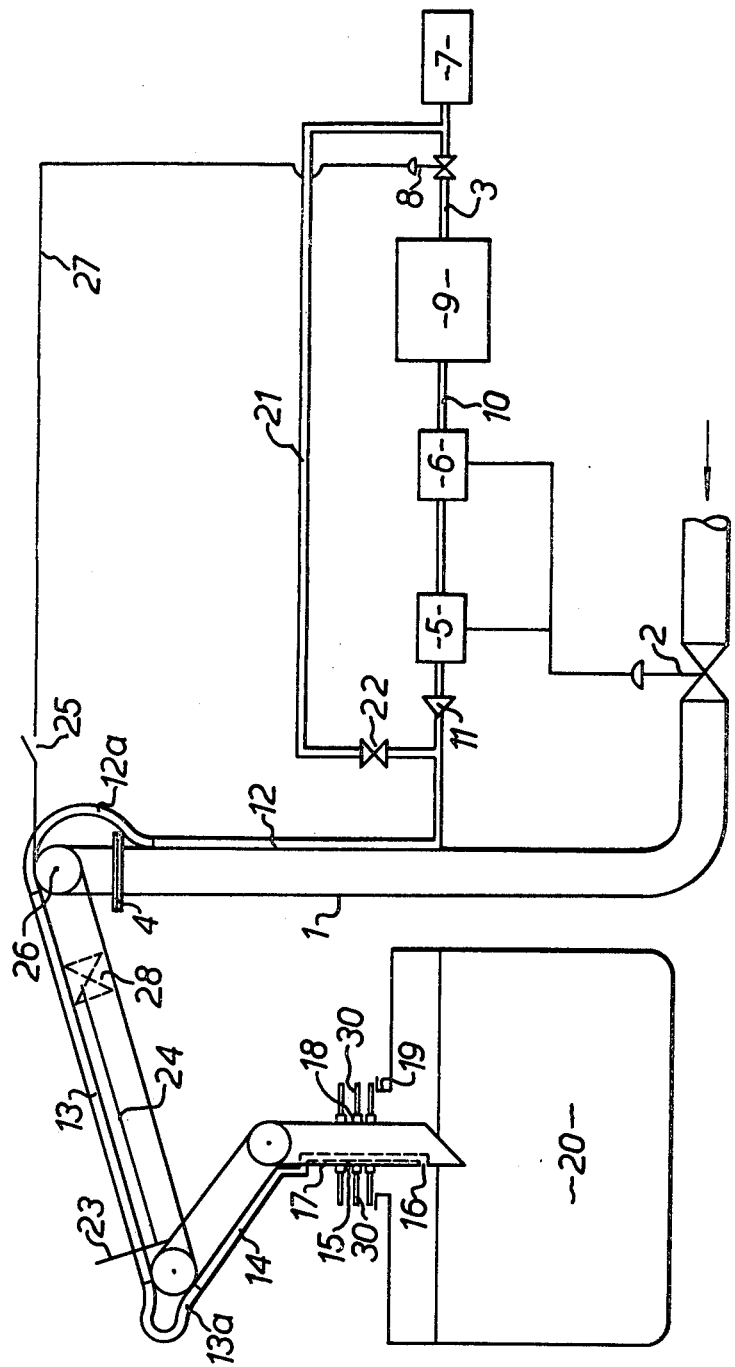

3,494,387
LIQUID DELIVERY DEVICE
Graham Gillies, Sanderstead, Michael Grigg, Ealing, and Anthony J. R. Isaacs, Hitchin, England, assignors to Esso Research and Engineering Company, a corporation of Delaware
Filed May 11, 1967, Ser. No. 637,697
Claims priority, application Great Britain, May 13, 1966, 21,378/66
Int. Cl. B65b *31/00, 1/04;* B67c *3/02*
U.S. Cl. 141—40                                4 Claims

ABSTRACT OF THE DISCLOSURE

An automatic liquid loading apparatus comprising a loading arm, a gas pipe attached to the loading arm, a locator attached to the loading arm, and a pressure switch capable of automatically activating a device for cutting off the flow of liquid through the loading arm when the gas pressure in the gas pipe rises to a certain predetermined level, thereby indicating that the vessel being filled with liquid is full. Means are also provided for automatically shutting off the flow of gas to said gas pipe when said arm is removed from said vessel.

---

This invention relates to devices for controlling the delivery of liquid into tanks or vessels.

At the moment when road and rail vehicles are filled with oil they are usually loaded to a given volume. The volume is usually controlled by the use of a pre-set meter which automatically cuts off the flow of oil, or by loading to a fixed marker and determining the volume by a calibrated ullage bar or dip-stick.

In future it is highly likely that these vehicles will be loaded and weighed. Thus, the vehicles will first be weighed empty, loaded, and then weighed full of liquid. The liquid will be loaded into the vehicle through a delivery pipe, and equipment will be necessary to automatically cut off the flow of liquid through the delivery pipe when it reaches a predetermined level in the vehicle. Although existing equipment could be used, there are certain serious disadvantages. Pre-set meters are expensive, especially since one is required for each separate liquid and loading point. The use of a fixed marker is time consuming and haphazard. This is especially the case when the liquid foams, and the result is often that the vehicle is under-utilised or worse, an overspill occurs.

Another alternative for loading vehicles would be to install level switches in each vessel based on either a float or a pressure/diaphragm principle. However, the disadvantages of this would be the high cost of conversion and the doubt as to whether such equipment immersed in relatively viscous liquids, e.g. fuel oil, could work reliably, particularly in cold weather.

According to this invention such difficulties are overcome by the use of an automatic liquid loading apparatus comprising a delivery pipe, a gas pipe capable of being positioned so that it has an open end inside the vessel into which the liquid is delivered, a locator attached to the delivery pipe, and a pressure switch capable of automatically actuating a device for cutting off the flow of liquid through the delivery pipe when the gas pressure in the gas pipe rises to a certain predetermined level.

To operate the apparatus, the gas pipe is connected to a source of compressed gas, the delivery pipe is placed in position for delivering liquid into the vessel, the gas pipe having an open end inside the vessel, the compressed gas is allowed to flow through the gas pipe, and liquid caused to flow through the delivery pipe until the flow is automatically stopped by activation of the pressure switch.

The delivery pipe should preferably be a loading arm, i.e. an articulated pipe. Loading arms are now fairly common for delivery of liquids and have the advantage that the drop pipe of the loading arm is held automatically in position, e.g. by counterbalance, whilst the liquid flows through the pipe.

The gas pipe in most cases will be used to convey air but could be used to convey an inert gas such as nitrogen or carbon dioxide. This pipe should preferably have a small bore in comparison with the delivery pipe. Thus, a bore of about 1 cm. or less will be suitable for the gas pipe. When a loading arm is used the gas pipe should preferably be in sections, metal tubing for the straight lengths of the loading arm, and flexible hose around the joints of the loading arm.

The gas pipe is preferably attached to the delivery pipe, and may be attached to the outside of the delivery pipe, e.g. by brackets, or welding. However, in order to minimize the risk of damage, it is preferable if the gas pipe or part of the gas pipe is fitted inside the delivery pipe. The end of the gas pipe preferably terminates near the delivery end of the delivery pipe, and in the preferred case when a loading arm is used, near the delivery end of the drop pipe. The gas pipe can conveniently terminate above the end of the drop pipe, for example, 5 to 10 cm. above the delivery end of the drop pipe. If the outlet end of the gas pipe is fitted inside the drop pipe of the loading arm, this end of the gas pipe also preferably terminates above the delivery end of the drop pipe, but also to avoid the effect of the fluid velocity head, the outlet end of the gas pipe is preferably turned through 90° and is terminated in a hole in the wall of the drop pipe above the delivery end thereof. In this manner gas flows through the gas pipe and into the vessel being fillled with liquid without causing any bubbling until the liquid level rises up to the end of the gas pipe.

Attached to the delivery pipe is also a locator, so that the correct position of the delivery pipe inside the vessel can be seen outside the vessel. Preferably this locator is also a support for the delivery pipe. In the preferred case, the locator is a disc or spider attached to the drop pipe, and of sufficiently large size that the locator can rest on the top of the manhole of the vessel and support the drop pipe while it is in position inside the vessel. The position of the end of the gas pipe should be adjusted so that the end of the gas pipe is near the top of the vessel when liquid is being loaded into the vessel. When viscous liquids are being loaded, it is preferable if the position of the locator is such that the delivery pipe terminates near the top of the vessel.

If desired, the position of the locator on the delivery pipe can be adjustable, so as to be able to vary the position of the end of the gas pipe inside the vessel, and to be able to cope with the fact that different vessels have different ullages. Thus, the locator may be fixed to the delivery pipe by a bayonet fitting, the pipe having a series of protruding pins at various levels. Alternatively the locator in the form of a spider may have a boss which slides over the delivery pipe and which is made fast by tightening a screw. As a third alternative the locator could consist of a number of fingers each attached to an adjustable ring on the pipe which may be pre-adjusted and locked in position to suit the various vessels being filled. The fingers which may be in the form of hooks can rest on the top of the manhole. Also there may be a number, e.g. three or four, adjustable rings on the pipe.

The apparatus of the invention also includes a pressure switch. This switch should be capable of being in communication with the gas in the gas pipe, and is designed to actuate the cut-off device when the pressure of gas in the pipe rises to a certain predetermined level. The cut-off device is preferably a valve, e.g. a magnetic, motorised, or air-operated valve. When actuated the valves closes, thereby stopping the flow of liquid through the delivery pipe into the vessel. If desired, this pressure switch may also produce an audible signal to notify the operator when the pressure in the gas pipe rises to the predetermined level.

When the delivery pipe is a loading arm the apparatus may also incorporate a gas flow control, which is capable of automatically regulating (e.g. starting or stopping) the flow of gas through the gas pipe in accordance with the attitude of the loading arm. A suitable example of this control is a mercury switch connected to a solenoid operated gas valve. This control is conveniently actuated by rotation of one of the joints of the loading arm.

The apparatus of the invention may incorporate other refinements. Thus for example, there may be a low pressure switch to act as a fail-safe should the pressure fall below a certain predetermined level in the gas pipe. If the pressure does fall below this level the low-pressure switch is actuated, and this automatically stops the flow of liquid to the vessel through the delivery pipe. Thus, there is no danger of the vessel being overfilled due to failure of gas pressure in the pipe. The apparatus may also have a purge line capable of being connected to a source of pressurized gas, e.g. compressed air. This purge line may be used in the event of the gas pipe being plugged with liquid. Finally, the delivery pipe can have a manual over-ride so that the flow of liquid can be stopped by hand in the event of an emergency.

To operate the apparatus of this invention, the gas pipe must be connected to a source of compressed gas, preferably compressed air, maintained at a pressure above atmospheric pressure. Although the gas pipe can be connected directly to the source of compressed gas, it is preferably connected via a pressure regulator. Such a pressure regulator eliminates any sudden surge of pressure coming from the source of compressed gas which might actuate the pressure switch, and enables one to use a high pressure supply (which may be readily available). Only low gas pressure is necessary to operate the device. The regulator may however be by-passed so that one can use high pressure gas to purge the gas pipe where viscous liquids are being handled.

When the source of gas is connected to the apparatus and the gas flow started the delivery pipe is installed in position in the vessel. The liquid is pumped through the delivery pipe, and flow of liquid continues until the liquid level in the vessel rises up to the level of the open end of the gas pipe. When this stage is reached there is a build-up of pressure in the gas pipe which actuates the pressure switch. Actuation of the pressure switch actuates the cut-off device which stops the flow of liquid into the delivery pipe, and loading of the vessel then ceases.

The apparatus of the invention is particularly suitable for the controlled delivery of fuel oils, bunker fuels, heating oils, etc. but can be used for other liquids.

The invention is now further described with reference to the accompanying drawings which shows in diagrammatic form an automatic liquid loading apparatus filling a road tanker with fuel oil.

The loading arm 1 has a solenoid valve 2 which is connected electrically to the low and high pressure switches 5 and 6 respectively. The arm also has a swivel joint 4. An air compressor 7 passes compressed air at about 5.6 kg./cm.$^2$ through an air control valve 8 with a pressure regulator 9 via the air line 3. In the pressure regulator 9 the air pressure is reduced to about 1.4 kg./cm.$^2$. The air then passes in the low pressure line 10 through the pressure switches 6 and 5 and non-return valve 11, and the line 10 is connected to the air line fixed to the outside of the loading arm 1.

The air line consists of straight sections 12, 13 and 14 joined together by flexible connections 12a and 13a. Section 14 penetrates the drop pipe 17 and continues as section 15 inside the drop pipe. Finally the air line terminates as an aperture 16 in the side wall of the drop pipe 17.

The drop pipe carries a series of adjustable rings 18 each having three fingers 30 in the form of hooks. The fingers 30 and 31 can rest on the manhole 19 of the tanker 20, and by selecting a suitable ring and three fingers the drop pipe can be supported at the desired level.

The devise also has a purge line 21 and valve 22 which bypasses the pressure switches 5 and 6, valve 11 and regulator 9. There is also a manually operated over-ride 23 which by a mechanical link 24 can shut off the supply of liquid by closing the valve 28. Finally a mercury switch 25 actuated by rotation of the joint 26 of the loading arm 1 can start or stop the flow of compressed air through its electrical connection 27 with the valve 8.

To operate the device the loading arm 1 is installed in position with the spider 18 resting on the manhole 19 of the tank 20. Whilst it is being lowered into the tank the switch 25 will have been actuated and the air flow automatically started. The liquid is pumped through the loading arm and this continues until the liquid level reaches the level of the aperture 16. On reaching this level the switch 6 will be actuated and this will close the valve 2 thereby shutting off the supply of liquid through the loading arm. The loading arm is then raised, and the switch 25 will be actuated thereby automatically closing valve 8 so that no more compressed air passes through the loading arm.

We claim:

1. An automatic liquid loading apparatus comprising an articulated loading arm delivery conduit, a gas pipe at least a part of which is fitted inside said delivery conduit and capable of being positioned so that it has an open end inside a vessel into which liquid is to be delivered, means for introducing gas into said gas pipe, a locator attached to the delivery conduit, a device for cutting off the flow of liquid through the delivery conduit when the gas pressure in the gas pipe rises to a certain predetermined level, a pressure switch capable of automatically actuating said cut-off device and gas flow control means associated with said introducing means and said articulated loading arm delivery conduit, said last means adapted to shut off the gas flow to said gas pipe when said arm is removed from said vessel.

2. An apparatus as claimed in claim 1 wherein the gas pipe has a small bore in comparison with the delivery pipe.

3. An apparatus as claimed in claim 1 wherein the outlet end of the gas pipe terminates above the delivery end of said articulated loading arm conduit.

4. An apparatus as claimed in claim 3 wherein the locator comprises a number of fingers each attached to a ring adjustable in position on said loading arm conduit, the ring being capable of being locked in position at different levels on said conduit.

References Cited

UNITED STATES PATENTS

| | | | |
|---|---|---|---|
| 547,627 | 10/1895 | Crawford | 141—226 |
| 2,489,028 | 11/1949 | Graham et al. | 141—40 X |
| 2,745,585 | 5/1956 | Lindars | 141—40 |

HOUSTON S. BELL, Jr., Primary Examiner

U.S. Cl. X.R.

141—99, 104, 198, 279, 387